(12) United States Patent
Kuriyama et al.

(10) Patent No.: US 9,921,347 B2
(45) Date of Patent: Mar. 20, 2018

(54) ALIGNMENT FILM, METHOD OF MANUFACTURING THE ALIGNMENT FILM, RETARDATION FILM, METHOD OF MANUFACTURING THE RETARDATION FILM, AND DISPLAY

(75) Inventors: Akito Kuriyama, Tokyo (JP); Eiki Ohyanagi, Miyagi (JP); Junichi Inoue, Tochigi (JP); Kei Obata, Miyagi (JP)

(73) Assignee: Saturn Licensing LLC, New York, NY (US)

( * ) Notice: Subject to any disclaimer, the term of this patent is extended or adjusted under 35 U.S.C. 154(b) by 640 days.

(21) Appl. No.: 13/818,536

(22) PCT Filed: Aug. 17, 2011

(86) PCT No.: PCT/JP2011/068594
§ 371 (c)(1),
(2), (4) Date: Sep. 6, 2013

(87) PCT Pub. No.: WO2012/026371
PCT Pub. Date: Mar. 1, 2012

(65) Prior Publication Data
US 2013/0335942 A1    Dec. 19, 2013

(30) Foreign Application Priority Data
Aug. 27, 2010 (JP) .............................. P2010-190766

(51) Int. Cl.
*G02B 5/30* (2006.01)
*B05D 3/12* (2006.01)
(Continued)

(52) U.S. Cl.
CPC ................. *G02B 5/30* (2013.01); *B05D 3/12* (2013.01); *G02B 5/3083* (2013.01);
(Continued)

(58) Field of Classification Search
None
See application file for complete search history.

(56) References Cited

U.S. PATENT DOCUMENTS 6,034,755 A *   3/2000 Watanabe ..................... 349/118
2005/0200779 A1*  9/2005 Ishikawa ............ G02F 1/133632
349/118
(Continued)

FOREIGN PATENT DOCUMENTS

CN        1540372     10/2004
CN      101201423      6/2008
(Continued)

OTHER PUBLICATIONS

Korean Office Action dated May 17, 2017 in corresponding Application No. 10-20137003954.
(Continued)

*Primary Examiner* — Anthony J Frost
(74) *Attorney, Agent, or Firm* — K&L Gates LLP

(57) ABSTRACT

An alignment film capable of reducing occurrence of alignment disorder in a simple manner, a method of manufacturing the alignment film, a retardation film, a method of manufacturing the retardation film, and a display are provided. An alignment film is configured of an anchor layer and an alignment layer stacked in this order on a base. The alignment layer includes a groove region having a plurality of fine grooves on a surface thereof, and a groove region having a plurality of fine grooves on a surface thereof. The anchor layer provided between the base and the alignment layer is provided with an antistatic function in addition to a function of bringing the alignment layer into close contact with the base.

10 Claims, 9 Drawing Sheets

(51) Int. Cl.
*G02B 27/00* (2006.01)
*G02F 1/13363* (2006.01)

(52) U.S. Cl.
CPC .... *G02B 27/0006* (2013.01); *B32B 2457/202* (2013.01); *G02F 1/13363* (2013.01); *Y10T 428/1005* (2015.01); *Y10T 428/2457* (2015.01)

(56) References Cited

U.S. PATENT DOCUMENTS

| | | | |
|---|---|---|---|
| 2006/0068329 A1* | 3/2006 | Aylward | G02F 1/1333 430/311 |
| 2009/0084487 A1* | 4/2009 | Iijima | H01G 4/30 156/89.12 |
| 2009/0176077 A1* | 7/2009 | Horio | G02B 1/105 428/217 |
| 2010/0073604 A1* | 3/2010 | Okuyama | B29D 11/00644 349/75 |
| 2011/0212302 A1 | 9/2011 | Nitta et al. | |

FOREIGN PATENT DOCUMENTS

| | | |
|---|---|---|
| JP | 9-230334 | 9/1997 |
| JP | 11-212078 | 8/1999 |
| JP | 2002122741 | 4/2002 |
| JP | 2007-293229 | 11/2007 |
| JP | 2008-517306 | 5/2008 |
| JP | 2010-139823 | 12/2008 |
| TW | 201027195 | 7/2010 |
| TW | 201030392 | 8/2010 |
| WO | 2010032540 | 3/2010 |

OTHER PUBLICATIONS

Japanese Notification of Reasons for Refusal dated Jun. 29, 2015 in Japanese Application No. 2012-530632.
International Search Report dated Nov. 1, 2011 in International Application No. PCT/JP2011/068594.
Chinese Office Action dated Jul 28, 2014 in Chinese Application No. 2011800404283.

* cited by examiner

[ FIG. 1 ]
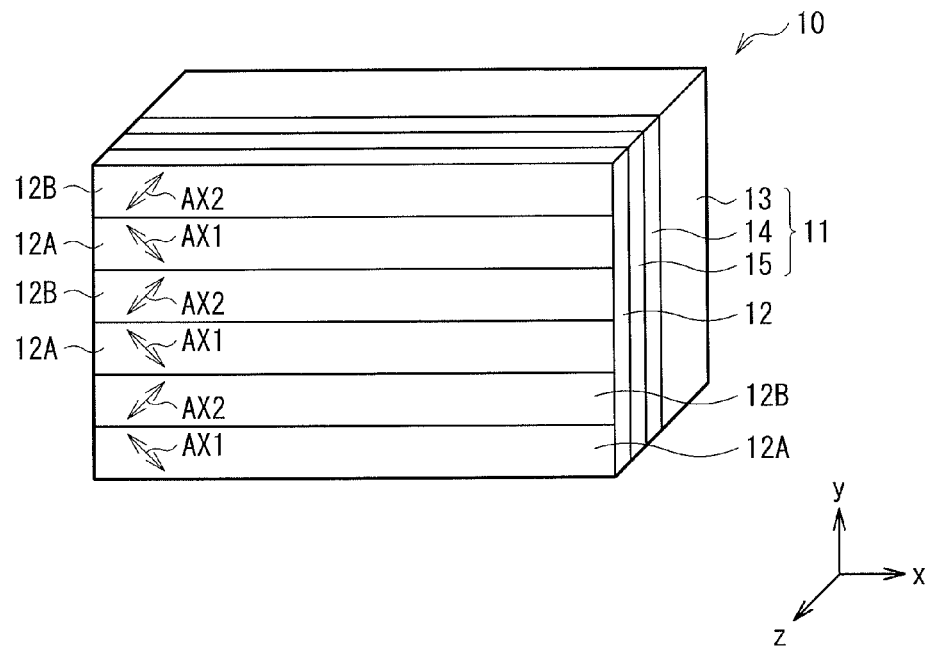
[ FIG. 2 ]
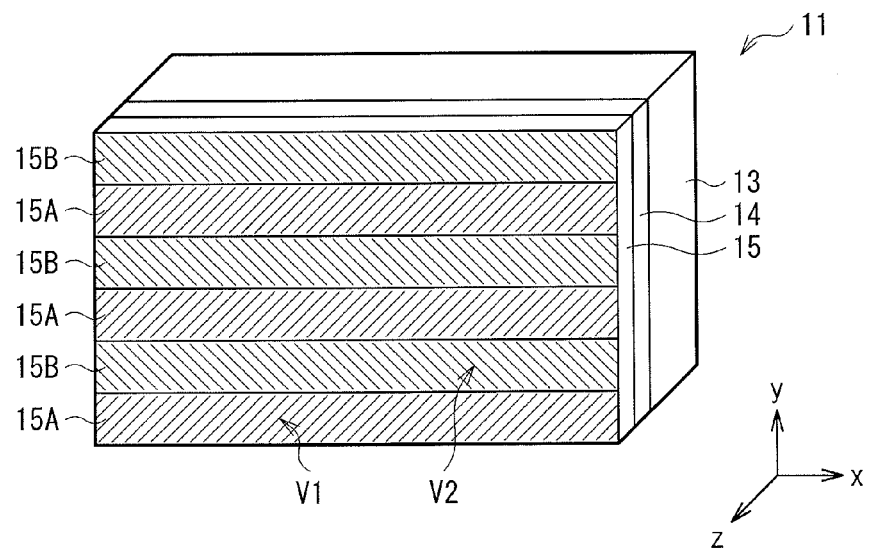

[ FIG. 3 ]

| | RESIN 1 | RESIN 2 | RESIN 3 | CONDUCTIVE POLYMER | SOLVENT | ADHESION CHARACTE-RISTICS WITH BASE | ADHESION CHARACTE-RISTICS WITH ALIGNMENT LAYER | SURFACE RESISTANCE ($\Omega/cm^2$) | LIQUID CRYSTAL ALIGN-MENT |
|---|---|---|---|---|---|---|---|---|---|
| EXAMPLE 1 | PENTAERY-THRITOL TRIACRYLATE (M-305) | POLYESTER ACRYLATE (M-9050) | UV URETHANE ACRYLATE OLIGOMER (UV7605B) | IONIC LIQUID (CIL-641) | BUTYL ACETATE/ ISOPROPYL ALCOHOL | ○ | ○ | $4 \times 10^{11}$ | ○ |
| RATIO | 60 | 20 | 20 | 15 | 150/50 | — | — | — | — |
| EXAMPLE 2 | SAME AS ABOVE | SAME AS ABOVE | SAME AS ABOVE | POLYTHIO-PHENE (SAS-PE-02) | SAME AS ABOVE | ○ | ○ | $8.7 \times 10^{11}$ | ○ |
| RATIO | 60 | 20 | 20 | 15 | 100/100 | — | — | — | — |
| EXAMPLE 3 | SAME AS ABOVE | SAME AS ABOVE | SAME AS ABOVE | POLYPY-RROLE (CDP-310M) | SAME AS ABOVE | ○ | ○ | $6 \times 10^{11}$ | ○ |
| RATIO | 60 | 20 | 20 | 15 | 100/100 | — | — | — | — |
| COMPARA-TIVE EXAMPLE 1 | SAME AS ABOVE | SAME AS ABOVE | SAME AS ABOVE | — | SAME AS ABOVE | ○ | ○ | $>1 \times 10^{13}$ | × |
| RATIO | 60 | 20 | 20 | — | 100 | — | — | — | — |

[ FIG. 4 ]

| | RESIN 1 | RESIN 2 | RESIN 3 | CONDUCTIVE POLYMER | SOLVENT | ADHESION CHARACTE-RISTICS WITH BASE | ADHESION CHARACTE-RISTICS WITH ALIGNMENT LAYER | SURFACE RESISTANCE ($\Omega/cm^2$) | LIQUID CRYSTAL ALIGN-MENT |
|---|---|---|---|---|---|---|---|---|---|
| EXAMPLE 4 | PENTAERY-THRITOL TRIACRYLATE (M-306) | POLYESTER ACRYLATE (M-8060) | UV URETHANE ACRYLATE OLIGOMER (UV7630B) | IONIC LIQUID (CIL-641) | BUTYL ACETATE/ ISOPROPYL ALCOHOL | ○ | ○ | $4 \times 10^{11}$ | ○ |
| RATIO | 60 | 20 | 20 | 15 | 150/50 | — | — | — | — |
| EXAMPLE 5 | SAME AS ABOVE | SAME AS ABOVE | SAME AS ABOVE | POLYTHIO-PHENE (SAS-PE-02) | SAME AS ABOVE | ○ | ○ | $8.7 \times 10^{11}$ | ○ |
| RATIO | 60 | 20 | 20 | 15 | 100/100 | — | — | — | — |
| EXAMPLE 6 | SAME AS ABOVE | SAME AS ABOVE | SAME AS ABOVE | POLYPY-RROLE (CDP-310M) | SAME AS ABOVE | ○ | ○ | $6 \times 10^{11}$ | ○ |
| RATIO | 60 | 20 | 20 | 15 | 100/100 | — | — | — | — |
| COMPARA-TIVE EXAMPLE 2 | SAME AS ABOVE | SAME AS ABOVE | SAME AS ABOVE | — | SAME AS ABOVE | ○ | ○ | $>1 \times 10^{13}$ | × |
| RATIO | 60 | 20 | 20 | — | 100 | — | — | — | — |

[ FIG. 5 ]
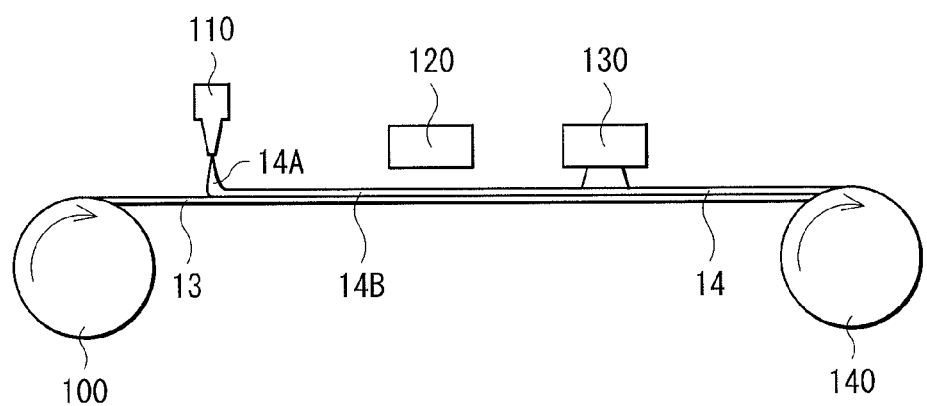

[ FIG. 6 ]
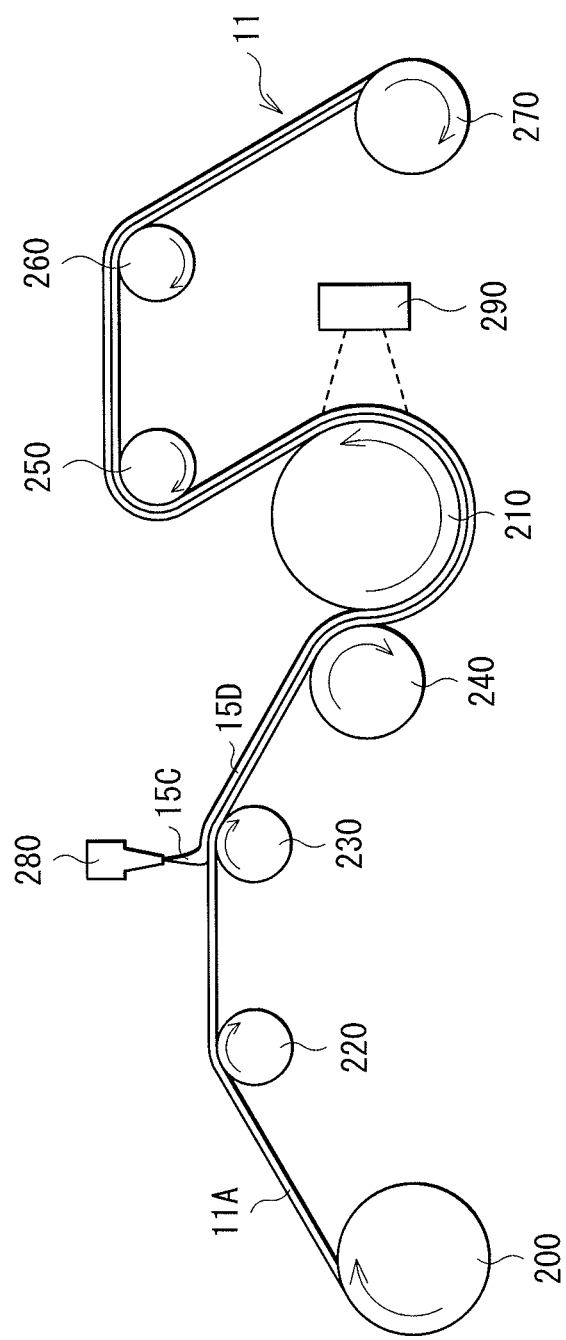

[ FIG. 7 ]
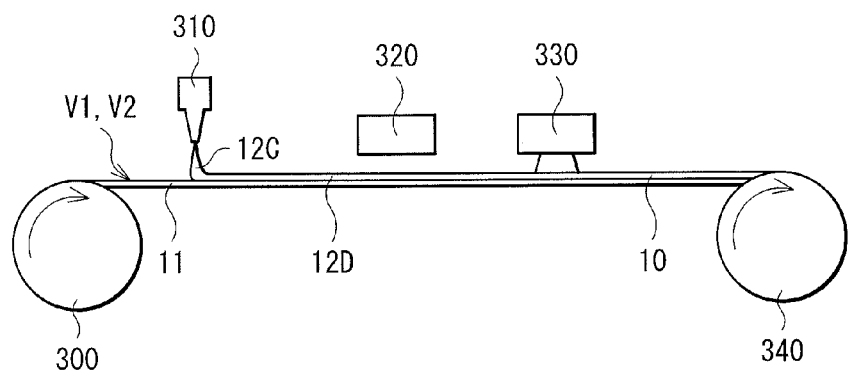
[ FIG. 8 ]
| SURFACE RESISTANCE ($\Omega/cm^2$) | LIQUID CRYSTAL ALIGNMENT | TRANSMITTANCE | ADHESION CHARACTERISTICS WITH BASE | ADHESION CHARACTERISTICS WITH ALIGNMENT LAYER |
|---|---|---|---|---|
| $10^{15}$ | × | 91.7 | ○ | ○ |
| $10^{14}$ | × | 91.5 | ○ | ○ |
| $10^{13}$ | △ | 91.4 | ○ | ○ |
| $10^{12}$ | ○ | 91.3 | ○ | ○ |
| $10^{11}$ | ○ | 91 | ○ | ○ |
| $10^{10}$ | ○ | 90.3 | ○ | △ |

[ FIG. 9 ]

|  | IONIC LIQUID | CONDUCTIVE POLYMER ||
|---|---|---|---|
|  |  | THIOPHENE | PYRROLE |
| SURFACE RESISTANCE ($\Omega/cm^2$) | $4 \times 10^{11}$ | $8.7 \times 10^{10}$ | $6 \times 10^{11}$ |
| OPTICAL CHARACTERISTICS (%) | 91.3 | 90.3 | 88.9 |
| ADHESION CHARACTERISTICS (BASE, ALIGNMENT LAYER) | ○ | ○ | ○ |

[ FIG. 10 ]

| NUMBER OF FUNCTIONAL GROUP IN RESIN 1 | ADHESION CHARACTERISTICS | RATE OF CHANGE IN DIMENSION |
|---|---|---|
| 1 FUNCTIONAL GROUP | × | ○ |
| 2 FUNCTIONAL GROUPS | × | ○ |
| 3 FUNCTIONAL GROUPS | ○ | ○ |
| 4 FUNCTIONAL GROUPS | ○ | ○ |
| 5 FUNCTIONAL GROUPS | ○ | × |

[ FIG. 11 ]

| THICKNESS OF ANCHOR LAYER ($\mu m$) | ADHESION CHARACTERISTICS | RATE OF CHANGE IN DIMENSION (%) |
|---|---|---|
| 0.5 | ○ | ○ (−0.002) |
| 2.0 | ○ | ○ (−0.003) |
| 3.5 | ○ | ○ (−0.007) |
| 5.0 | △ | △ (−0.011) |
| 7.5 | △ | △ (−0.014) |
| 10.0 | × | × (−0.020) |

[ FIG. 12 ]
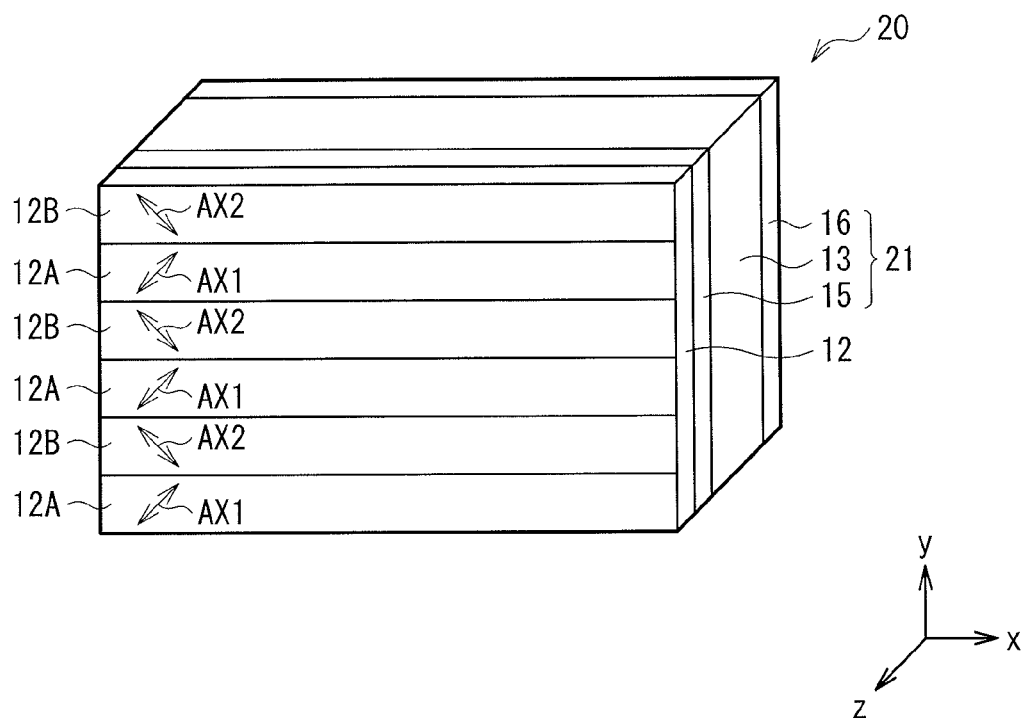

[FIG. 13]
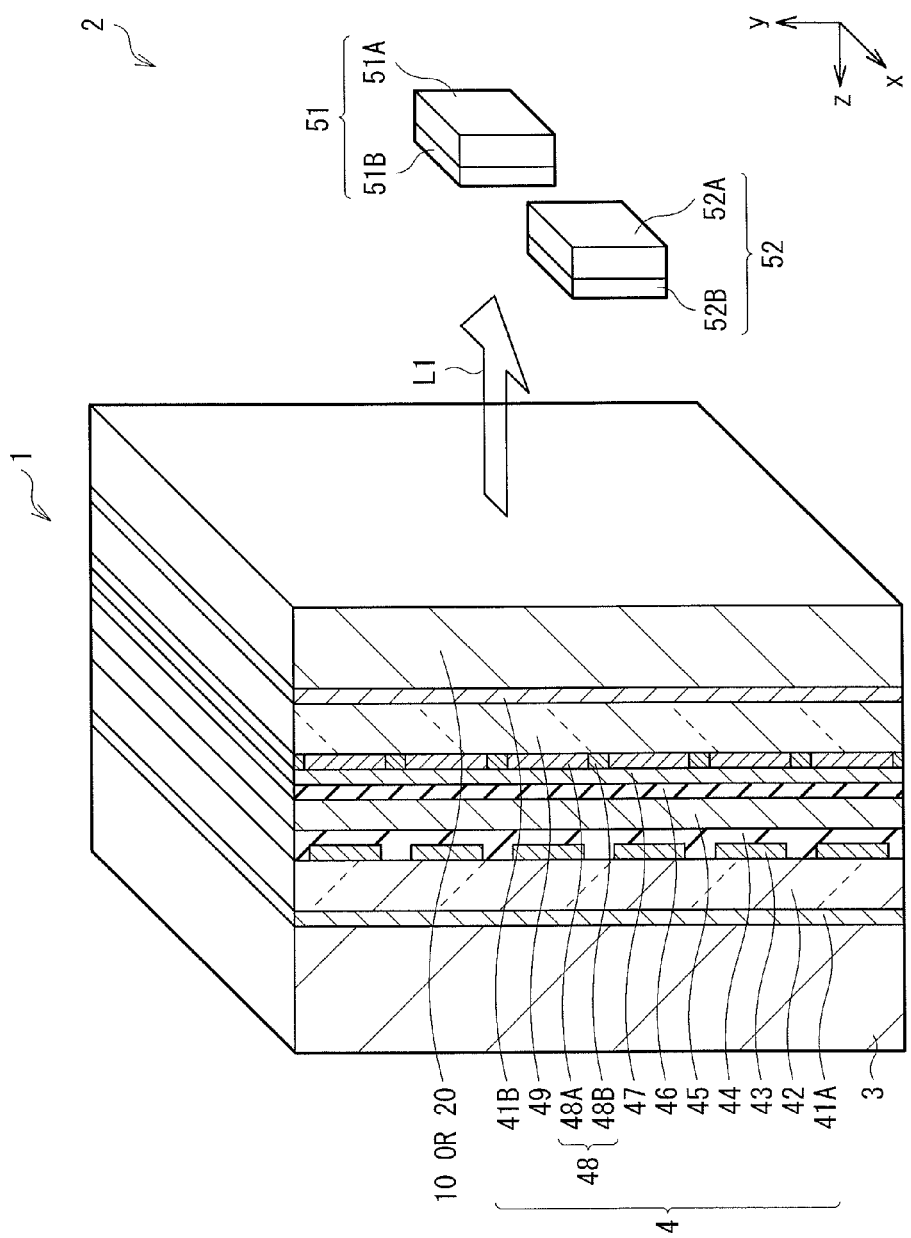

ALIGNMENT FILM, METHOD OF MANUFACTURING THE ALIGNMENT FILM, RETARDATION FILM, METHOD OF MANUFACTURING THE RETARDATION FILM, AND DISPLAY

CROSS REFERENCES TO RELATED APPLICATIONS

The present application is a national stage of International Application No. PCT/JP2011/068594 filed on Aug. 17, 2011 and claims priority to Japanese Patent Application No. 2010-190766 filed on Aug. 27, 2010, the disclosure of which is incorporated herein by reference.

BACKGROUND

The present invention relates to an alignment film having fine grooves of nanometer order scale on a surface thereof, and to a method of manufacturing the alignment film. Also, the present invention relates to a retardation film including a retardation layer on the surface of the above-described alignment film, and to a method of manufacturing the retardation film. Furthermore, the present invention relates to a display including the above-described retardation film.

In the past, there has been a stereoscopic image display of a type using polarizing glasses, that includes left-eye pixels and right-eye pixels emitting light in different polarization states. In such a display, while an observer wears polarizing glasses, light emitted from each left-eye pixel is incident only on the left eye, and light emitted from each right-eye pixel is incident only on the right eye, so that observation of a stereoscopic image is achieved.

For example, in PTL 1, a retardation film is used to allow left-eye pixels and right-eye pixels to emit light in different polarization states. This retardation film has retardation regions, each of which has a slow or fast axis in one direction, corresponding to left-eye pixels, and has retardation regions, each of which has a slow or fast axis in a direction different from that of the above-described retardation regions, corresponding to right-eye pixels.

CITATION LIST

Patent Literature

[PTL 1] WO/2010/032540

SUMMARY

Here, the above-described retardation region is, for example, formed by applying an alignable material such as liquid crystal on an alignment film having fine irregularities of the order of nm (nanometer), and then curing the applied alignable material. Such an alignment film exhibits low alignment regulation compared with an alignment film formed through rubbing. As a result, for example, a large amount of static electricity is generated on, for example, an alignment film during a manufacturing process, and thus, alignment disorder occurs in the alignable material on the alignment film, which may disadvantageously cause streaks and/or unevenness in a displayed image.

In particular, as described in PTL 1, when an alignment film is produced by, for example, feeding a base from a roll, moving the fed base while supporting the base by a guide roll, applying a resin onto the base, and transferring a reverse pattern of a roll-like master onto the applied resin, a large amount of static electricity is likely to be generated on the base due to contact and/or separation between the base and the guide roll. Hence, a certain approach is necessary to reduce the alignment disorder in such a manufacturing process, such as removal of static electricity from the base, and introduction of an equipment that prevents generation of static electricity on the base. Such an approach, however, disadvantageously takes enormous effort and/or cost.

An object of the invention, which is made in light of such an issue, is to provide an alignment film capable of reducing occurrence of alignment disorder in a simple manner, a method of manufacturing the alignment film, a retardation film, a method of manufacturing the retardation film, and a display.

A first alignment film according to the present invention includes an anchor layer and an alignment layer stacked in this order on a base. The alignment layer has a plurality of fine grooves of nanometer order scale on a surface thereof, the plurality of fine grooves extending in a particular direction. The anchor layer is in contact with the base and with the alignment layer, and has surface resistance of $10^{13}$ ohms per square centimeter or less. It is to be noted that a certain layer may be provided on the back of the base or on the top of the alignment layer.

A first retardation film according to the present invention includes an anchor layer, an alignment layer, and a retardation layer stacked in this order on a base. The alignment layer has a plurality of fine grooves of nanometer order scale on a surface thereof, the plurality of fine grooves extending in a particular direction. The anchor layer is in contact with the base and with the alignment layer, and has surface resistance of $10^{13}$ ohms per square centimeter or less. It is to be noted that a certain layer may be provided on the back of the base or between the alignment layer and the retardation layer.

A first display according to the present invention include: a light source; a display cell performing display based on light from the light source; a first polarizer provided on a light source side of the display cell; a second polarizer provided on a display side of the display cell; and a retardation film disposed on a light emission side of each of one or both of the first polarizer and the second polarizer. The retardation film mounted on the display has the same configuration as that of the above-described first retardation film.

In the first alignment film of the present invention, the first retardation film of the present invention, and the first display of the present invention, the anchor layer provided between the base and the alignment layer has surface resistance of $10^{13}$ $\Omega/cm^2$ or less. This allows static electricity to be less likely to be generated on the film during each of the manufacturing processes of the first alignment film and the first retardation film.

A second alignment film of the present invention includes an alignment layer on a main surface of a base, the base including a protective layer laminated on a back thereof. The alignment layer includes a plurality of fine grooves of nanometer order scale on a surface thereof, the plurality of fine grooves extending in a particular direction. The protective layer has surface resistance of $10^{13}$ ohms per square centimeter or less. It is to be noted that a certain layer may be provided between the base and the alignment layer or on the top of the alignment layer.

A second retardation film of the invention is formed of a base having a protective layer laminated on the back of the base, and an alignment layer and a retardation layer stacked in this order on the main surface of the base. The alignment layer has a plurality of fine grooves of nanometer order scale, each groove extending in a particular direction, on the surface of the alignment layer. The protective layer has a surface resistance of $10^{13}$ $\Omega/cm^2$ or less. It is to be noted that a certain layer may be provided between the base and the alignment layer or between the alignment layer and the retardation layer.

A second display of the present invention includes: a light source; a display cell performing display based on light from the light source; a first polarizer provided on a light source side of the display cell; a second polarizer provided on a display side of the display cell; and a retardation film disposed on a light emission side of each of one or both of the first polarizer and the second polarizer. The retardation film mounted on the display has the same configuration as that of the above-described second retardation film.

In the second alignment film of the present invention, the second retardation film of the present invention, and the second display of the present invention, the protective layer provided on the back of the base has surface resistance of $10^{13}$ $\Omega/cm^2$ or less. This allows static electricity to be less likely to be generated on the film during each of the manufacturing processes of the second alignment film and the second retardation film.

A method of manufacturing the first alignment film of the present invention includes the following two steps.

(A1) a first step of forming an anchor layer having surface resistance of $10^{13}$ ohms per square centimeter or less on a base movably supported by a roll, and then forming an uncured or not-completely-cured energy-curable resin layer on the anchor layer (A2) a second step of pressing a die including, on a surface thereof, a plurality of fine grooves of nanometer order scale onto the energy-curable resin layer, and curing the energy-curable resin layer in that state to transfer a reverse pattern of the die to a surface of the energy-curable resin layer, the plurality of fine grooves extending in a particular direction A method of manufacturing the first retardation film of the present invention includes the following three steps.

(B1) a first step of forming, on a base movably supported by a roll, an anchor layer having surface resistance of $10^{13}$ ohms per square centimeter or less, and then forming an uncured or not-completely-cured energy-curable resin layer on the anchor layer (B2) a second step of pressing a die including, on a surface thereof, a plurality of fine grooves of nanometer order scale onto the energy-curable resin layer, and curing the energy-curable resin layer in that state to form an alignment layer including the energy-curable resin layer that has a surface to which a reverse pattern of the die is transferred, the plurality of fine grooves extending in a particular direction (B3) a third step of forming, on a surface of the alignment layer, a layer containing an alignable material being aligned according to asperities of the surface of the alignment layer, to form a retardation layer In the method of manufacturing the first alignment film of the present invention and the method of manufacturing the first retardation film of the present invention, the anchor layer provided between the base and the alignment layer has surface resistance of $10^{13}$ $\Omega/cm^2$ or less. This allows static electricity to be less likely to be generated on the film during the manufacturing process.

A method of manufacturing the second alignment film of the present invention includes the following two steps.

(C1) a first step of forming an uncured or not-completely-cured energy-curable resin layer on a main surface of a base being movably supported by a roll and including a protective layer laminated on a surface thereof closer to the roll, the protective layer having surface resistance of $10^{13}$ ohms per square centimeter or less (C2) a second step of pressing a die including, on a surface thereof, a plurality of fine grooves of nanometer order scale onto the energy-curable resin layer, and curing the energy-curable resin layer in that state to transfer a reverse pattern of the die to a surface of the energy-curable resin layer, the plurality of fine grooves extending in a particular direction A method of manufacturing the second retardation film of the present invention includes the following three steps.

(D1) a first step of forming an uncured or not-completely-cured energy-curable resin layer on a main surface of a base being movably supported by a roll and including a protective layer laminated on a surface thereof closer to the roll, the protective layer having surface resistance of $10^{13}$ ohms per square centimeter or less (D2) a second step of pressing a die including, on a surface thereof, a plurality of fine grooves of nanometer order scale onto the energy-curable resin layer, and curing the energy-curable resin layer in that state to transfer a reverse pattern of the die to a surface of the energy-curable resin layer and thereby forming an alignment layer, the plurality of fine grooves extending in a particular direction (D3) a third step of forming, on a surface of the alignment layer, a layer containing an alignable material being aligned according to asperities of the surface of the alignment layer, to form a retardation layer In the method of manufacturing the second alignment film of the present invention and the method of manufacturing the second retardation film of the present invention, the protective layer provided on the back of the base has surface resistance of $10^{13}$ $\Omega/cm^2$ or less. This allows static electricity to be less likely to be generated on the film during the manufacturing process.

According to the alignment film and the method of manufacturing the alignment film of the present invention, the retardation film and the method of manufacturing the retardation film of the present invention, and the display of the present invention, the anchor layer provided between the base and the alignment layer or the protective layer provided on the back of the base is provided with an antistatic function in addition to the basic function of the layer itself. This makes it possible to prevent occurrence of a large amount of static electricity on the film during the manufacturing process without providing a special layer for prevention of static charge in the film, and without providing any special equipment for prevention of static charge. As a result, occurrence of alignment disorder is reduced in a simple manner.

BRIEF DESCRIPTION OF THE FIGURES

Additional features and advantages are described herein, and will be apparent from the following Detailed Description and the figures.

FIG. 1 is a diagram perspectively illustrating an exemplary configuration of a retardation film according to a first embodiment of the present invention.

FIG. 2 is a diagram perspectively illustrating an exemplary configuration of an alignment film in FIG. 1.

FIG. 3 is a diagram showing an exemplary relationship between a material for an anchor layer in FIG. 1 and characteristics of the retardation film in FIG. 1, together with that in a comparative example.

FIG. 4 is a diagram showing another exemplary relationship between a material for the anchor layer in FIG. 1 and characteristics of the retardation film, together with that in a comparative example.

FIG. 5 is a diagram explaining an exemplary method of manufacturing the alignment film in FIG. 1.

FIG. 6 is a diagram explaining an exemplary method of manufacturing the retardation film in FIG. 1.

FIG. 7 is a diagram explaining exemplary steps following FIG. 6.

FIG. 8 is a diagram showing an exemplary relationship between surface resistance of the anchor layer and the characteristics of the retardation film.

FIG. 9 is a diagram showing an exemplary relationship between a type of a conductive material added to an anchor material and the characteristics of the retardation film.

FIG. 10 is a diagram showing an exemplary relationship between the number of functional groups in acrylate monomer as a major raw material for the anchor material and the characteristics of the retardation film.

FIG. 11 is a diagram showing an exemplary relationship between thickness of the anchor layer and the characteristics of the retardation film.

FIG. 12 is a diagram perspectively illustrating an exemplary configuration of a retardation film according to a second embodiment of the present invention.

FIG. 13 is a diagram illustrating an exemplary schematic configuration of a display according to an application example.

DETAILED DESCRIPTION

Hereinafter, embodiments of the present invention will be described in detail with reference to drawings. It is to be noted that description is made in the following order.
1. First Embodiment
    Example with an anchor layer having an antistatic function
2. Second Embodiment
    Example with a protective layer having an antistatic function
3. Application Example
    Example using a retardation film in 3D display
4. Modifications 1. First Embodiment

[Configuration]
FIG. 1 perspectively illustrates an exemplary configuration of a retardation film 10 according to a first embodiment of the present invention. For example, as illustrated in FIG. 1, the retardation film 10 of the present embodiment has a retardation layer 12 on an alignment film 11. The alignment film 11 is, for example, formed of an anchor layer 14 and an alignment layer 15 stacked on a base 13 in this order of closeness to the base 13.

The base 13 secures stiffness of the retardation film 10 as a whole, and is formed of a transparent resin film, for example. The base 13 is preferably formed of a material having a small optical anisotropy, namely, a material having a small birefringence. Examples of the transparent resin film having such characteristics include TAC (triacetylcellulose), COP (cycloolefin polymer), COC (cycloolefin copolymer), and PMMA (polymethylmethacrylate). Examples of COP include ZEONOR and ZEONEX (registered trademarks of ZEON CORPORATION) and ARTON (a registered trademark of JSR Corporation). The base 13 has a thickness of, for example, 30 μm to 500 μm both inclusive.

Moreover, the base 13 is preferably formed of a material that has excellent dimensional stability, and is substantially not expanded or contracted depending on external environment. Examples of the material having such characteristics include a thermoplastic norbornene-based resin film. Examples of a commercially-available film corresponding to the thermoplastic norbornene-based resin film include ZEONOR described above. It is to be noted that the base 13 may have a monolayer structure or may have a multilayer structure.

The anchor layer 14 is an adhesive layer that brings the alignment layer 15 into strong contact with the base 13, and is in contact with the base 13 and with the alignment layer 15. The anchor layer 14 is in strong contact with the base 13, and has excellent adhesion to the alignment layer 15. The anchor layer 14 has an antistatic function in addition to the function of bringing the alignment layer 15 into strong contact with the base 13. The antistatic function is a function achieved through smooth migration of electrons within a substance. The anchor layer 14 has surface resistance of $10^{13}$ $\Omega/cm^2$ or less, preferably $10^{12}$ $\Omega/cm^2$ or less.

For example, as described in detail later, the anchor layer 14 is formed by applying an anchor material containing 50 parts by weight to 90 parts by weight both inclusive of an acrylate monomer with three or more functional groups, a conductive material, and a solvent for dispersion of the conductive material, and then, drying and curing (polymerizing) the anchor material. In the case where the anchor layer 14 is manufactured with the materials as exemplified above, even if the base 13 is formed of a material not having high adhesion characteristics to the alignment layer 15, for example, a material such as the above-described thermoplastic norbornene-based resin film, the alignment layer 15 is allowed to be brought into strong contact with the base 13. The anchor layer 14 exhibits the antistatic function due to the above-described conductive material.

It is to be noted that, in the case where the anchor layer 14 is manufactured with the acrylate monomer exemplified above as a main raw material, the anchor layer 14 contains little acrylate monomer as the raw material. One reason for this is that the monomer is consumed during a polymerization process. However, a slight amount of acrylic component remaining in the anchor layer 14 is detected through IR (infrared absorption spectrometry) spectral analysis of the anchor layer 14. It is to be noted that raw materials for the anchor layer 14 are described in detail later in description of a method of manufacturing the anchor layer.

Here, examples of the conductive material include conductive polymers, ionic liquids, conductive inorganic fillers, and quaternary ammonium salts. Examples of the conductive polymers include polythiophene-based polymers, polyaniline-based polymers, and polypyrrole-based polymers. Examples of the ionic liquid include CIL-312, CIL-512, and CIL-641 (any of which is available from Japan Carlit Co., Ltd.). It is to be noted that the ionic liquids also include ionic conductive polymers. Further, the above-described solvent contains butyl acetate and isopropyl alcohol, for example. Butyl acetate is a material that has a property of roughening the surface of the base 13, and is particularly suitable for roughening the surface of the above-described thermoplastic norbornene-based resin film. Isopropyl alcohol is a material suitable for dissolving (or dispersing) a conductive material added to the anchor material. If the conductive material is an ionic liquid, the butyl acetate and isopropyl alcohol contained in the solvent are preferably in a mixing ratio of 4:1. Further, if the conductive material is the conductive polymer in the material system as exemplified above, the butyl acetate and isopropyl alcohol contained in the solvent are preferably in a mixing ratio of 1:1.

It is to be noted that a polymerization initiator is preferably contained in the above-described anchor material. Examples of the polymerization initiator include a photo-polymerization initiator having an absorption wavelength in an ultraviolet range and responding to ultraviolet rays, and a thermal polymerization initiator responding to heat. In addition, any of various additives may be contained in the above-described anchor material as necessary.

The alignment layer 15 is to align an alignable material (for example, liquid crystalline monomer) as a raw material for the retardation layer 12 during the manufacturing process. The alignment layer 15 is formed on the base 13 with the anchor layer 14 therebetween, and has two types of groove regions 15A and 15B on a surface thereof, for example, as illustrated in FIG. 2. The groove regions 15A and 15B each have, for example, a strip-like shape, and are alternately arranged in a direction intersecting an extending direction of the groove regions 15A and 15B. Each groove region has a strip width equal to a pixel pitch of a display (described later), for example.

Each of the groove regions 15A has a plurality of fine grooves V1 on a surface thereof. Each fine groove V1 has a width of, for example, several hundred nanometers, and has a depth of, for example, several hundred nanometers. The plurality of fine grooves V1 extend along the same direction d1 (not illustrated). Each of the groove regions 15B has a plurality of fine grooves V2 on a surface thereof. Each fine groove V2 has a width of, for example, several hundred nanometers, and has a depth of, for example, several hundred nanometers. The plurality of fine grooves V2 extend along the same direction d2 (not illustrated). The directions d1 and d2 are, for example, orthogonal to each other.

The retardation layer 12 is formed in contact with the groove regions 15A and 15B of the alignment layer 15. The retardation layer 12 is formed of strip-like retardation regions 12A and 12B being alternately arranged. The retardation regions 12A are formed in contact with the groove regions 15A. The retardation regions 12B are formed in contact with the groove regions 15B. The retardation regions 12A and 12B have retardation characteristics different from each other. Specifically, each retardation region 12A has an optical axis (a slow axis AX1) in an extending direction of the fine groove V1, and each retardation region 12B has an optical axis (a slow axis AX2) in an extending direction of the fine groove V2.

The retardation layer 12 includes a polymerized polymer liquid crystal material, for example. Specifically, an alignment state of each liquid crystal molecule (not illustrated) is fixed in the retardation layer 12. As the polymer liquid crystal material, a material is used that is selected depending on, for example, phase transition temperature (between a liquid crystal phase and an isotropic phase), wavelength dispersion characteristics of a refractive index of a liquid crystal material, viscosity characteristics, process temperature, and/or the like. Note that the polymer liquid crystal material preferably has an acryloyl group or a (meta)acryloyl group from the viewpoint of transparency. Further, a material having no methylene spacer between a polymerizable functional group and a liquid crystal skeleton is preferably used since the alignment treatment temperature during a process is allowed to be lowered thereby. The retardation layer 12 has a thickness of, for example, 0.1 μm to 10 μm. It is to be noted that, in the case where the retardation layer 12 includes a polymerized polymer liquid crystal material, the retardation layer 12 may not be formed of only the polymerized polymer liquid crystal material, but may partially contain unpolymerized liquid crystalline monomer. One reason for this is as follows: the unpolymerized liquid crystalline monomer contained in the retardation layer 12 is aligned in a direction similar to an alignment direction of liquid crystal molecules (not illustrated) in the periphery of the unpolymerized liquid crystalline monomer due to alignment treatment (heating treatment) described later, and has alignment characteristics similar to those of the polymer liquid crystal material.

The major axis of each liquid crystal molecule runs along the extending direction of the fine groove V1 near the interface of the groove region 15A and the retardation region 12A. Further, liquid crystal molecules in an upper portion of the retardation region 12A are also aligned in accordance with the alignment direction of the liquid crystal molecules in a lower portion thereof. In other words, alignment of the liquid crystal molecules is controlled by a shape of the fine groove V1 extending in a predetermined direction in the groove region 15A, and the optical axis of the retardation region 12A is set thereby. Similarly, the major axis of each liquid crystal molecule runs along the extending direction of the fine groove V2 near the interface of the groove region 15B and the retardation region 12B. Further, liquid crystal molecules in an upper portion of the retardation region 12B are also aligned in accordance with the alignment direction of the liquid crystal molecules in a lower portion thereof. In other words, alignment of the liquid crystal molecules is controlled by a shape of the fine groove V2 extending in a predetermined direction in the groove region 15B, and the optical axis of the retardation region 12B is set thereby.

Moreover, the retardation value of the retardation layer 12 is set through adjustment of a constitutional material and/or thickness of each of the retardation regions 12A and 12B of the retardation layer 12. In the case where the base 13 has retardation, the retardation value of the retardation layer 12 is preferably set in consideration of the retardation of the base 13 as well.

[Manufacturing Method]

An exemplary method of manufacturing the retardation film 10 of the present embodiment is now described.

First, a thermoplastic norbornene-based resin film having a width of 1350 mm and a thickness of 100 μm is prepared by a melt extrusion process (not illustrated). Hereinafter, the prepared thermoplastic norbornene-based resin film is used as the base 13. Then, a material used as the anchor material 14A is prepared. Specifically, as the anchor material 14A, a resin material that contains 50 parts by weight to 90 parts by weight both inclusive of an acrylate monomer with three or more functional groups, a conductive material, and a solvent for dispersion of the conductive material. More specifically, as the anchor material 14A, a resin material that contains 50 parts by weight to 90 parts by weight both inclusive of an acrylate monomer with three or more functional groups, an ester-based resin that has favorable compatibility, and a urethane-based resin increasing hardness of resins. If the ester-based resin and the urethane-based resin as other materials are included, the acrylate monomer contained in the anchor material 14A is preferably 50 parts by weight to 65 parts by weight. The following material is most preferred as the anchor material 14A for the thermoplastic norbornene-based resin film: a material containing 60 parts by weight of the acrylate monomer, 20 parts by weight of the ester-based resin, and 20 parts by weight of the urethane-based resin.

FIGS. 3 and 4 illustrate specific examples of materials contained in the anchor material 14A. Each anchor material 14A described in Examples 1, 2, and 3 and comparative example 1 contains 60 parts by weight of pentaerythritol triacrylate (Aronix M-305, available from Toagosei Co., Ltd.), 20 parts by weight of polyester acrylate (Aronix M-9050, available from Toagosei Co., Ltd.), and 20 parts by weight of UV urethane acrylate oligomer (UV 7605B, available from Nippon Synthetic Chemical Industry Co., Ltd.). Each anchor material 14A described in Examples 4, 5, and 6 and comparative example 2 contains 60 parts by weight of pentaerythritol triacrylate (Aronix M-306 available from Toagosei Co., Ltd.), 20 parts by weight of polyester acrylate (Aronix M-8060 available from Toagosei Co., Ltd.), and 20 parts by weight of UV urethane acrylate oligomer (UV 7630B, available from Nippon Synthetic Chemical Industry Co., Ltd.).

Each anchor material 14A described in Examples 1 and 4 contains, as additives, 3.5 parts by weight of Irgacure 184D as a photopolymerization initiator, 0.01 parts by weight of a leveling agent, 15 parts by weight of an ionic liquid (CIL-641, available from Japan Carlit Co., Ltd.) as a conductive material, 150 parts by weight of butyl acetate, and 50 parts by weight of isopropyl alcohol. Each anchor material 14A described in Examples 2 and 5 contains, as additives, 3.5 parts by weight of Irgacure 184D as a photopolymerization initiator, 0.01 parts by weight of a leveling agent, 15 parts by weight of polythiophene-based conductive polymer (SAS-PE-02) as a conductive material, 100 parts by weight of butyl acetate, and 100 parts by weight of isopropyl alcohol. Each anchor material 14A described in Examples 3 and 6 contains, as additives, 3.5 parts by weight of Irgacure 184D as a photopolymerization initiator, 0.01 parts by weight of a leveling agent, 15 parts by weight of polypyrrole-based conductive polymer (CDP-310M) as a conductive material, 100 parts by weight of butyl acetate, and 100 parts by weight of isopropyl alcohol. Each anchor material 14A described in comparative examples 1 and 2 contains, as additives, 3.5 parts by weight of Irgacure 184D as a photopolymerization initiator, 0.01 parts by weight of a leveling agent, and 100 parts by weight of butyl acetate. The conductive material as described in each Example is not mixed in the anchor material 14A described in each comparative example.

Then, the anchor layer 14 is formed on the base 13. Specifically, first, for example, as illustrated in FIG. 5, the base 13 is unwound from a unwinding roll 100, and then the anchor material 14A is dropped onto the top of the unwound base 13 from, for example, a discharger 110 to form an anchor layer 14B. Then, for example, the anchor layer 14B is dried by a heater 120, and is then cured by irradiating the anchor layer 14B with UV light having an intensity of, for example, about 1000 mJ/cm² with an ultraviolet irradiator 130. In this way, the anchor layer 14 is formed on the base 13. Here, the anchor layer 14 is in strong contact with the surface of the base 13, and thus is not readily peeled off. Then, the base 13 is wound on a winding roll 140.

It is to be noted that, although butyl acetate is used as the solvent in each of the above-described Examples and the comparative examples, another solvent which does not influence the base 13 may be used instead of butyl acetate. In such a case, the anchor layer 14 is also allowed to be in strong contact with the surface of the base 13. It is to be noted that, in the case where a solvent such as butyl acetate, which roughens the surface of the base 13, is used as the solvent, the anchor layer 14 is allowed to be in further strong contact with the surface of the base 13 due to the roughened surface.

Examples of the solvent which roughens the surface of the base 13 include typical organic solvent such as acetone, isobutyl alcohol, isopropyl alcohol, isopentyl alcohol, diethyl ether, ethylene glycol, ethylene glycol monoethyl ether, ethylene glycol monoethyl ether acetate, ethylene glycol mono-normal butyl ether, ethylene glycol monomethyl ether, isobutyl acetate, isopropyl acetate, isopentyl acetate, ethyl acetate, cyclohexanone, 1,4-dioxane, tetrahydrofuran, toluene, 1-butanol, methanol, methyl isobutyl ketone, and methyl ethyl ketone, and a mixture of two or more thereof.

Then, the alignment film 11 is fabricated through formation of the alignment layer 15 on the anchor layer 14. While any of a plate-like master and a roll-like master may be used for formation of the alignment layer 15, a case using the roll-like master is now described.

FIG. 6 illustrates an exemplary configuration of production unit producing the alignment layer 15 with the roll-like master. The production unit illustrated in FIG. 6 includes an unwinding roll 200, guide rolls 220, 230, 250, and 260, a nip roll 240, a roll-like master 210, a winding roll 270, a discharger 280, and an ultraviolet irradiator 290. The unwinding roll 200 includes a concentrically wound film 11A that includes the anchor layer 14 provided on the base 13, and is to supply the film 11A. The film 11A is unwound from the unwinding roll 200, and flows along a path including the guide roll 220, the guide roll 230, the nip roll 240, the roll-like master 210, the guide roll 250, and the guide roll 260 in sequence, and is finally wound on the winding roll 270. The guide rolls 220 and 230 are each to guide the film 11A supplied from the unwinding roll 200 to the nip roll 240. The nip roll 240 presses the film 11A supplied from the guide roll 230 onto the roll-like master 210. The roll-like master 210 is disposed with a predetermined gap from the nip roll 240. The respective reverse patterns of the plurality of fine grooves V1 and the plurality of fine grooves V2 are provided on the circumferential surface of the roll-like master 210. The guide roll 250 is to peel off the film 11A wound on the roll-like master 210. Further, the guide roll 260 is to guide the film 11A peeled off by the guide roll 250 to the winding roll 270. The discharger 280 is provided with a predetermined gap from a portion, of the film 11A supplied from the unwinding roll 200, in contact with the guide roll 230. The discharger 280 drops, for example, a UV-curable resin liquid 15C containing a UV-curable acrylic-resin liquid onto the film 11A. The ultraviolet irradiator 290 applies ultraviolet rays to a part, of the film 11A supplied from the unwinding roll 200, that is in contact with the roll-like master 210 after passing along the nip roll 240.

The alignment film 11 is formed with the production unit having such a configuration. Specifically, first, the film 11A is unwound from the unwinding roll 200 and is guided to the guide roll 230 via the guide roll 220, and then an uncured or not-completely-cured UV-curable resin liquid 15C (uncured or not-completely-cured energy-curable resin liquid layer) is dropped onto the film 11A from, for example, the discharger 280 to form a UV-curable resin layer 15D. The UV-curable resin layer 15D on the film 11A is pressed to the circumferential surface of the roll-like master 210 by the nip roll 240 with the film 11A therebetween. As a result, the UV-curable resin layer 15D is brought into contact with the circumferential surface of the roll-like master 210, and an irregular pattern formed on the circumferential surface of the roll-like master 210 is transferred to the UV-curable resin layer 15D.

Subsequently, the ultraviolet irradiator 290 applies ultraviolet rays to the UV-curable resin layer 15D to cure the UV-curable resin layer 15D. Subsequently, the film 11A is peeled off from the roll-like master 210 by the guide roll 250, and then is wound on the winding roll 270 via the guide roll 260. In this way, the alignment film 11 is formed.

Subsequently, the retardation layer 12 is formed on the alignment film 11 to form the retardation film 10. Specifically, for example, as illustrated in FIG. 7, the alignment film 11 is unwound from an unwinding roll 300, and then liquid crystal 12C containing liquid crystalline monomer is dropped from a discharger 310 onto the surfaces of the plurality of fine grooves V1 and V2 on the unwound alignment film 11 to form a liquid crystal layer 12D. In this process, a polymer compound having no methylene spacer between a polymerizable functional group and a liquid crystal skeleton is preferably used as the liquid crystal 12C. In such a case, a nematic phase is exhibited near room temperature. This makes it possible to lower the heating temperature during alignment treatment in a subsequent step.

In this process, a solvent to dissolve the liquid crystalline monomer, a polymerization initiator, a polymerization inhibitor, a surfactant, a leveling agent, and/or other materials may be used for the liquid crystal layer as necessary. The solvent is not particularly limited, however, a solvent which highly dissolves the liquid crystalline monomer, has a low vapor pressure at room temperature, and is less likely to vaporize at room temperature, is preferably used. Examples of the solvent that is less likely to vaporize at room temperature include 1-methoxy-2-acetoxypropane (PGMEA), toluene, methyl ethyl ketone (MEK), and methyl isobutyl ketone (MIBK).

Subsequently, the liquid crystalline monomer in the liquid crystal layer 12D applied on the surface of the alignment film 11 is subjected to alignment treatment (heating treatment) with a heater 320. The heating treatment is performed at a temperature equal to or higher than the phase transition temperature of the liquid crystalline monomer (the phase transition temperature between the liquid crystal phase and the isotropic phase). The heating treatment is performed at a temperature equal to or higher than solvent temperature at which the solvent dries, for example, 50° C. to 130° C. both inclusive, if the solvent is used. Note that it is important to control the heating rate, holding temperature, time, cooling rate, and/or other parameters. For example, in the case where the liquid crystal layer 12D is used in which a liquid crystalline monomer having a phase transition temperature of 52° C. is dissolved in 1-methoxy-2-acetoxypropane (PGMEA) such that the solid content is 30 wt %, first, the liquid crystalline monomer is heated to a temperature equal to or higher than the phase transition temperature (52° C.) of the liquid crystalline monomer, at which the solvent is allowed to dry, for example, about 70° C., and is held at the temperature for about several minutes.

Here, shearing stress may exert on an interface of the liquid crystalline monomer and the base due to coating of the liquid crystalline monomer in the previous step, which causes alignment due to flow (flow alignment) and/or alignment due to force (external-force alignment), leading to alignment of liquid crystal molecules in an unintended direction. The above-described heating treatment is performed to temporarily cancel the alignment state of the liquid crystalline monomer that has been aligned in such an unintended direction. As a result, the solvent dries, and the liquid crystal layer may include only the liquid crystalline monomer in a state of the isotropic phase.

Subsequently, the liquid crystal layer 12D is cooled to a temperature slightly lower than the phase transition temperature. As a result, the liquid crystalline monomer is aligned in accordance with the patterns of the plurality of fine grooves V1 and V2 formed on the surface of the alignment film 11. In other words, the liquid crystalline monomer is aligned along the extending directions of the plurality of fine grooves V1 and V2.

Subsequently, the ultraviolet irradiator 330 applies ultraviolet rays to the liquid crystal layer 12D subjected to the alignment treatment to polymerize the liquid crystalline monomer in the liquid crystal layer 12D. At this time, although the process temperature is often around the room temperature in general, the temperature may be raised to the phase transition temperature or lower to adjust a retardation value. This allows the alignment state of each liquid crystal molecule to be fixed along the extending direction of the plurality of fine grooves V1 and V2, and the retardation layer 12 (retardation regions 12A and 12B) is formed. Thus, the retardation film 10 is completed. Subsequently, the retardation film 10 is wound on a winding roll 340.

[Effects]

The effects of the retardation film 10 of the present embodiment are now described.

First, a relationship between surface resistance of the anchor layer 14 and characteristics (alignment defects and adhesion characteristics) of the retardation film 10 is described. FIG. 8 collectively shows adhesion characteristics, surface resistance, and liquid crystal alignment of each retardation film according to Examples shown in FIGS. 3 and 4, and shows adhesion characteristics, surface resistance, and liquid crystal alignment of each retardation film according to the comparative examples. It is to be noted that FIG. 8 also shows results of retardation films that are not shown in FIGS. 3 and 4. In FIGS. 3, 4, and 8, "white circle (○)" of liquid crystal alignment refers to a fact that, when 100 pieces of retardation film 10 were prepared and mounted on displays, any piece did not show any streak or unevenness. Further, in FIG. 8, "white triangle (Δ)" of liquid crystal alignment refers to a fact that, when 100 pieces of retardation film 10 were prepared and mounted on displays, some slightly showed streaks and/or unevenness. Further, in FIGS. 3, 4, and 8, "cross (x)" of liquid crystal alignment refers to a fact that, when 100 pieces of retardation film 10 were prepared and mounted on displays, some clearly showed streaks and/or unevenness. Further, in FIGS. 3, 4, and 8, "white circle" of adhesion characteristics refers to a fact that, when 100 pieces of retardation film 10 were prepared, any piece was not peeled off. Further, in FIG. 8, "white triangle" of adhesion characteristics refers to a fact that while 100 pieces of retardation film 10 were prepared, a few retardation films 10 were peeled off.

It can be seen from FIGS. 3, 4, and 8 that, in the case where the anchor layer 14 has the antistatic function, and has surface resistance of $10^{13}$ ($\Omega/cm^2$) or less, alignment defects are reduced. Further, it can be seen from FIGS. 3, 4, and 8 that, in the case where the anchor layer 14 has the antistatic function, and has surface resistance of $10^{12}$ ($\Omega/cm^2$) or less, substantially no alignment defect occurs. Therefore, it can be seen from FIGS. 3, 4, and 8 that the surface resistance of the anchor layer 14 of $10^{13}$ ($\Omega/cm^2$) or less is preferred in light of a decrease in alignment defects, and the surface resistance of the anchor layer 14 of $10^{12}$ ($\Omega/cm^2$) or less is more preferred in light of a decrease in alignment defects.

It is to be noted that it can be also seen from FIGS. 3, 4, and 8 that the conductive material in the anchor layer 14 has no adverse effect on adhesion characteristics with the base 13 and on transmittance. However, it can be seen from FIG. 8 that, if a large amount of conductive material is added to the anchor material 14A to extremely reduce the surface resistance of the anchor layer 14 to about $10^{10}$ ($\Omega/cm^2$), adhesion characteristics with the alignment layer 15 is slightly affected thereby.

Subsequently, a relationship between a type of the conductive material added to the anchor layer 14 and the surface resistance of the anchor layer 14, and further, a relationship between a type of the conductive material added to the anchor layer 14 and characteristics (optical characteristics and adhesion characteristics) of the retardation film 10 are described with reference to FIG. 9. It is to be noted that "white circle" in the column of adhesion characteristics in FIG. 9 indicates the same meaning as that of "white circle" in the column of adhesion characteristics in each of FIGS. 3, 4, and 8.

As shown in FIG. 9, the ionic liquid provides high transparency compared with other materials. This shows that the ionic liquid is highly dissolved in the solvent. Consequently, the ionic liquid may be regarded to be most suitable as the conductive material added to the anchor layer 14.

Furthermore, a relationship between the number of the functional groups in the acrylate monomer as a major raw material for the anchor material 14A and characteristics (adhesion characteristics and the rate of change in dimension) of the retardation film 10 is described with reference to FIG. 10. FIG. 10 illustrates the relationship between the number of the functional groups in the acrylate monomer as the major raw material for the anchor material 14A (the number of the functional groups in resin shown in the column of resin 1 in each of FIGS. 3 and 4) and the characteristics (adhesion characteristics and the rate of change in dimension) of the retardation film 10. In FIG. 10, "cross" of adhesion characteristics refers to a fact that, when 100 pieces of retardation film 10 were prepared, many pieces were peeled off. It is to be noted that "white circle" in the column of adhesion characteristics in FIG. 10 indicates the same meaning as that of "white circle" in the column of adhesion characteristics in each of FIGS. 3, 4, and 8. Moreover, in FIG. 10, "white circle" of the rate of change in dimension refers to a fact that no curl occurred, or a fact that slight curl occurred, which was however no problem for practical use. Moreover, in FIG. 10, "cross" of the rate of change in dimension refers to a fact that curl, which was too large for practical use, occurred.

It can be seen from FIG. 10 that, in the case where an acrylate monomer with one or two functional groups is mainly contained in the anchor material 14A, the anchor layer 14 has a small curing shrinkage percentage, and therefore, the retardation film 10 also has a small rate of change in dimension, but adhesion characteristics between the anchor layer 14 and the base 13 is low. On the other hand, in the case where an acrylate monomer with five or more functional groups is mainly contained in the anchor material 14A, adhesion characteristics between the anchor layer 14 and the base 13 is high, but the anchor layer 14 has a large curing shrinkage percentage, and the retardation film 10 also has a high rate of change in dimension. Therefore, it can be seen from FIG. 10 that it is preferred that an acrylate monomer with three or four functional groups be mainly contained in the anchor material 14A in light of adhesion characteristics and the rate of change in dimension.

A relationship between the thickness of the anchor layer 14 and the characteristics (adhesion characteristics and the rate of change in dimension) of the retardation film 10 is now described. FIG. 11 illustrates the relationship between the thickness of the anchor layer 14 and the characteristics (adhesion characteristics and the rate of change in dimension) of the retardation film 10. In FIG. 11, "white triangle" of the rate of change in dimension refers to a fact that certain level of curl occurred, which was however not so serious for practical use. It is to be noted that "white circle", "white triangle", and "cross" in the column of adhesion characteristics in FIG. 11 indicate the same meanings as those of "white circle", "white triangle", and "cross", respectively, in the column of adhesion characteristics in each of FIGS. 3, 4, 8, and 10. In addition, "white circle" and "cross" in the column of the rate of change in dimension in FIG. 11 indicates the same meanings as those of "white circle" and "cross", respectively, in the column of the rate of change in dimension in FIG. 10 described above.

It can be seen from FIG. 11 that, in the case where the anchor layer 14 has a thickness of 0.5 μm to 7.5 μm both inclusive, adhesion characteristics and the rate of change in dimension are each within an allowable range. Further, in the case where the anchor layer 14 has a thickness of 0.5 μm to 3.5 μm both inclusive, both of adhesion characteristics and the rate of change in dimension are extremely excellent.

To summarize the above, in the present embodiment, the anchor layer 14 provided between the base 13 and the alignment layer 15 is provided with an antistatic function in addition to the basic function of the layer itself. This makes it possible to prevent occurrence of a large amount of static electricity on the film during the manufacturing process without providing a special layer for prevention of static charge in the film, or without providing special equipment for prevention of static charge. As a result, occurrence of alignment disorder is reduced in a simple manner.

2. Second Embodiment

[Configuration]

FIG. 12 perspectively illustrates an exemplary configuration of a retardation film 20 according to a second embodiment of the present invention. For example, as illustrated in FIG. 12, the retardation film 20 of the present embodiment includes a protective layer 16 on the back of the base 13, and the alignment layer 15 and the retardation layer 12 in this order of closeness to the base 13 on the front surface (main surface) of the base 13. It is to be noted that the retardation film 20 may have an anchor layer, which brings the alignment layer 15 into close contact with the base 13, between the base 13 and the alignment layer 15. It is to be noted that the anchor layer may correspond to the anchor layer 14 in the above-described first embodiment, or may be a layer having only the function of bringing the alignment layer 15 into close contact with the base 13.

The protective layer 16 is, for example, laminated on the back of the base 13 so that the protective layer 16 is allowed to be peeled off therefrom. It is to be noted that the protective layer 16 may be fixed on the back of the base 13 by means other than lamination so that the protective layer 16 is allowed to be peeled off therefrom. The protective layer 16 has an antistatic function in addition to a function of protecting the back of the base 13, for example, from dust and/or dirt. That is, the protective layer 16 also serves as an antistatic layer. The protective layer 16 has surface resistance of $10^{13}$ $\Omega/cm^2$ or less, and preferably has surface resistance of $10^{12}$ $\Omega/cm^2$ or less.

[Manufacturing Method]

An exemplary method of manufacturing the retardation film 20 of the present embodiment is now described. First, the base 13 is prepared. Subsequently, the alignment layer 15 is formed on the base 13 with a unit similar to the production unit illustrated in FIG. 6, for example. Consequently, an alignment film 21 is formed. Subsequently, the retardation layer 12 is formed on the alignment film 21 with a unit similar to the production equipment illustrated in FIG. 7, for example. Consequently, a retardation film 20 is produced.

[Effects]

In the present embodiment, the protective layer 16 provided on the back of the base 13 is provided with an antistatic function in addition to the basic function of the layer itself. This makes it possible to prevent occurrence of a large amount of static electricity on the film during the manufacturing process without providing a special layer for prevention of static charge in the film, or without providing special equipment for prevention of static charge. As a result, occurrence of alignment disorder is reduced in a simple manner.

3. Application Example

FIG. 13 illustrates an exemplary configuration of a display 1 according to an application example of the retardation film 10 (or the retardation film 20) of the above-described embodiment. The display 1 is a polarizing-glasses type of display that displays a stereoscopic image to an observer (not illustrated) wearing polarizing glasses 2 described later in front of his/her eye balls. The display 1 is formed of a backlight unit 3, a display panel 4, and the retardation film 10 (or the retardation film 20) stacked in this order. In the display 1, the retardation film 10 (or the retardation film 20) is bonded to the surface on a light emission side of the display panel 4. The surface of the retardation film 10 (or the retardation film 20) is an image display surface, and is directed to the observer.

It is to be noted that, in the present application example, the display 1 is disposed such that the image display surface is parallel to a perpendicular surface (vertical surface). The image display surface has a rectangular shape, and the longitudinal direction of the image display surface is parallel to a horizontal direction. The observer views the image display surface while wearing the polarizing glasses 2 in front of his/her eye balls. The polarizing glasses 2 are of a circular polarization type, and the display 1 is a display for circular polarization glasses.

[Backlight Unit 3]

The backlight unit 3 includes, for example, a reflector, a light source, and an optical sheet (any of which is not illustrated). The reflector returns light emitted from the light source toward the optical sheet, and has functions of reflection, scattering, and diffusion. The reflector is formed of, for example, PET (polyethylene terephthalate) foam. Thus, light emitted from the light source is efficiently used. The light source, which illuminates the display panel 4 from the back, is formed of, for example, a plurality of linear light sources arranged in parallel at equal intervals, or a plurality of dot light sources arranged two-dimensionally. It is to be noted that examples of the linear light source include a hot cathode fluorescent lamp (HCFL) and a cold cathode fluorescent lamp (CCFL). Further, examples of the dot light source include a light emitting diode (LED). The optical sheet provides uniform in-plane luminance distribution of light from the light source, and adjusts a divergence angle or a polarization state of light from the light source to be within a desired range, and includes, for example, a diffuser plate, a diffuser sheet, a prism sheet, a reflective polarization device, a retardation film and/or the like.

[Display Panel 4]

The display panel 4 is a transmissive display panel including a plurality of pixels arranged two-dimensionally in row and column directions, and displays an image through driving pixels in response to image signals. For example, as illustrated in FIG. 13, the display panel 4 includes a polarizer 41A, a transparent substrate 42, pixel electrodes 43, an alignment layer 44, a liquid crystal layer 45, an alignment layer 46, a common electrode 47, a color filter 48, a transparent substrate 49, and a polarizer 41B in order of closeness to the backlight unit 3.

Here, The polarizer 41A is disposed on a light incidence side of the display panel 4, and the polarizer 41B is disposed on a light emission side thereof. Each of the polarizers 41A and 41B is a type of an optical shutter, and transmits light (polarized light) in a certain oscillation direction. For example, the polarizers 41A and 41B are disposed such that their polarizing axes are different from each other by a predetermined angle (for example, 90 degrees), so that light emitted from the backlight unit 3 is transmitted or blocked by the liquid crystal layer.

The direction of the transmission axis (not illustrated) of the polarizer 41A is set within a range in which light emitted from the backlight unit 3 is transmitted. For example, in the case where a polarizing axis of light emitted from the backlight unit 3 is in a vertical direction, the transmission axis of the polarizer 41A is also in the vertical direction. Moreover, for example, in the case where a polarizing axis of light emitted from the backlight unit 3 is in a horizontal direction, the transmission axis of the polarizer 41A is also in the horizontal direction. It is to be noted that light emitted from the backlight unit 3 is not limited to linearly-polarized light, but may be circularly-polarized light, elliptically-polarized light, or non-polarized light.

The direction of the polarizing axis (not illustrated) of the polarizer 41B is set within a range in which light passing through the display panel 4 is transmitted. For example, in the case where the polarizing axis of the polarizer 41A is in the horizontal direction, the polarizing axis of the polarizer 41B is in a direction (vertical direction) orthogonal to the horizontal direction. In the case where the polarizing axis of the polarizer 41A is in the vertical direction, the polarizing axis of the polarizer 41B is in a direction (horizontal direction) orthogonal to the vertical direction.

The transparent substrates 42 and 49 are typically transparent to visible light. It is to be noted that the transparent substrate 42 closer to the backlight unit 3 has active drive circuits including, for example, TFT (thin film transistor) as drive devices electrically connected to the transparent pixel electrodes, and wirings. The plurality of pixel electrodes 43 are, for example, arranged in a matrix in a plane of the transparent substrate 42. The pixel electrodes 43 are formed of, for example, indium tin oxide (ITO), and functions as electrodes for the respective pixels. The alignment layer 44 is formed, for example, of a polymer material such as polyimide, and performs alignment treatment to the liquid crystal. The liquid crystal layer 45 is formed of, for example, a VA (vertical alignment) mode liquid crystal. The liquid crystal layer 45 has a function of transmitting or blocking light emitted from the backlight unit 3 for each pixel in response to a voltage applied from an undepicted drive circuit. The common electrode 47 is formed of, for example, ITO, and functions as a common counter electrode. The color filter 48 is formed by arranging filter sections 48A for color separation of light emitted from the backlight unit 3 into three primary colors of red (R), green (G), and blue (B), for example. In the color filter 48, the filter section 48A is, a black matrix section 48B having a light-blocking function is provided in regions corresponding to boundaries between pixels.

[Retardation Film 10 or 20]

The retardation film 10 (or the retardation film 20) is now described. The retardation film 10 (or the retardation film 20) changes a polarization state of light transmitted by the polarizer 41B of the display panel 4. The retardation film 10 (or the retardation film 20) is, for example, disposed such that the base 13 is directed to a light emission side.

The slow axis of the base 13 is in the horizontal or in the vertical direction, for example. The retardation layer 12 is a thin layer having optical anisotropy. The retardation layer 12 has two types of retardation regions (retardation regions 12A and 12B) having different slow-axis directions.

For example, the retardation regions 12A and 12B each have a strip-like shape extending in one common direction (horizontal direction). The retardation regions 12A and 12B are regularly arranged side by side in an in-plane direction of the base 13. Specifically, the retardation regions 12A and 12B are alternately disposed in a shorter-side direction (vertical direction) of the retardation regions 12A and 12B. In addition, the retardation regions 12A and 12B are disposed in accordance with arrangement of the plurality of pixel electrodes 43.

For example, each of the slow axes AX1 and AX2 of the retardation regions 12A and 12B is in a direction intersecting each of the horizontal and vertical directions and is in a direction intersecting the slow axis of the base 13. Each of the slow axes AX1 and AX2 of the retardation regions 12A and 12B is also in a direction intersecting the polarizing axis of the polarizer 41B of the display panel 4. Furthermore, the slow axis AX1 of the retardation region 12A is in a direction the same as or corresponding to the direction of the slow axis of a right-eye retardation film 51B of polarizing glasses 2 described later, but different from the direction of the slow axis of a left-eye retardation film 52B. On the other hand, the slow axis AX2 of the retardation region 12B is in a direction the same as or corresponding to the direction of the slow axis of the left-eye retardation film 52B of the polarizing glasses 2 described later, but different from the direction of the slow axis of the right-eye retardation film 51B.

[Polarizing Glasses 2]

The polarizing glasses 2 are now described. The polarizing glasses 2 are worn by an observer (not illustrated) in front of his/her eye balls, and are used by the observer in observing an image appearing on the image display surface. For example, as illustrated in FIG. 13, the polarizing glasses 2 include a right-eye glass 51 and a left-eye glass 52.

The right-eye glass 51 and the left-eye glass 52 are disposed to face the image display surface of the display 1. It is to be noted that, although the right-eye glass 51 and the left-eye glass 52 are preferably disposed in one horizontal plane as much as possible as illustrated in FIG. 13, the right-eye glass 51 and the left-eye glass 52 may each be disposed in a slightly-inclined plane.

The right-eye glass 51 includes, for example, a polarizing plate 51A and the right-eye retardation film 51B. On the other hand, the left-eye glass 52 includes, for example, a polarizing plate 52A and the left-eye retardation film 52B. The right-eye retardation film 51B is provided on the surface on a light incidence side of the polarizing plate 51A. The left-eye retardation film 52B is provided on the surface on a light incidence side of the polarizing plate 52A.

Each of the polarizing plates 51A and 52A is disposed on a light emission side of the polarizing glasses 2, and transmits only light (polarized light) in a certain oscillation direction. The polarizing axes of the polarizing plates 51A and 52A are each in a direction orthogonal to the polarizing axis of the polarizer 41B. For example, in the case where the polarizing axis of the polarizer 41B is in the perpendicular direction, the polarizing axes of the polarizing plates 51A and 52A are each in the horizontal direction. In the case where the polarizing axis of the polarizer 41B is in the horizontal direction, the polarizing axes of the polarizing plates 51A and 52A are each in the perpendicular direction.

Each of the right-eye retardation film 51B and the left-eye retardation film 52B is a thin layer having optical anisotropy. Each of the slow axis of the right-eye retardation film 51B and the slow axis of the left-eye retardation film 52B is in a direction intersecting each of the horizontal and perpendicular directions, and also intersecting the polarizing axes of the polarizing plates 51A and 52A. Further, the polarizing axis of the polarizing plate 51A is in a direction the same as or corresponding to the direction of the slow axis of the retardation region 12A, but different from the direction of the slow axis of the retardation region 12B. On the other hand, the slow axis of the polarizing plate 52A is in a direction the same as or corresponding to the direction of the slow axis of the retardation region 12B, but different from the direction of the slow axis of the retardation region 12A.

[Method of Manufacturing Display 1]

An exemplary method of manufacturing the display 1 is now described. First, a laminate (not illustrated) is prepared that includes the transparent substrate 42, the pixel electrodes 43, the alignment layer 44, the liquid crystal layer 45, the alignment layer 46, the common electrode 47, the color filter 48, and the transparent substrate 49 stacked in this order. Next, the polarizer 41A is bonded to the back (a surface closer to the transparent substrate 42) of the laminate, and the polarizer 41B is bonded to the surface (a surface closer to the transparent substrate 49) of the laminate. In this way, the display panel 4 is completed. Subsequently, the retardation film 10 (or the retardation film 20) is bonded onto the polarizer 41B, and then, the backlight unit 3 is attached to the back (on the polarizer 41A side) of the display panel 4. In this way, the display 1 is completed.

It is to be noted that, in the case where the retardation film 20 is used in the display 1, the protective film 16 provided on the retardation film 20 is removed as necessary for image display by the display 1. It is to be noted that, hereinafter, a retardation film that is given after the protective film 16 is removed from the retardation film 20 is also referred to as retardation film 20 for convenience.

[Operation]

In the display 1 according to the present application example, first, while light applied from the backlight unit 3 is incident on the display panel 4, parallax signals including a right-eye image and a left-eye image are input to the display panel 4 as image signals. In response to this, right-eye image light is emitted from pixels on odd-numbered rows, and left-eye image light is emitted from pixels on even-numbered rows. Thereafter, the right-eye image light and the left-eye image light are converted to elliptically-polarized light by the retardation regions 12A and 12B of the retardation film 10 (or the retardation film 20). The converted elliptically-polarized light is then emitted to the outside through the image display surface of the display 1.

Subsequently, light $L_1$ emitted to the outside of the display 1 enters the polarizing glasses 2, and is reconverted from the elliptically-polarized light to the linearly-polarized light by the right-eye retardation film 51B and the left-eye retardation film 52B, and then enters the polarizing plates 51A and 52A of the polarizing glasses 2. Here, among light incident on the polarizing plates 51A and 52A, a polarizing axis of light corresponding to the right-eye image light is parallel to the polarizing axis of the polarizing plate 51A, and is orthogonal to the polarizing axis of the polarizing plate 52A. Hence, among light incident on the polarizing plates 51A and 52A, light corresponding to the right-eye image light is transmitted only by the polarizing plate 51A and arrives at the right eye of an observer. On the other hand, among light incident on the polarizing plates 51A and 52A, a polarizing axis of light corresponding to the left-eye image light is orthogonal to the polarizing axis of the polarizing plate 51A, and is parallel to the polarizing axis of the polarizing plate 52A. Hence, among light incident on the polarizing plates 51A and 52A, light corresponding to the left-eye image light is transmitted only by the polarizing plate 52A and arrives at the left eye of the observer.

In this way, light corresponding to the right-eye image light arrives at the right eye of an observer, and light corresponding to the left-eye image light arrives at the left eye of the observer. As a result, the observer recognizes an image as if the image is stereoscopically displayed on the image display surface of the display 1.

[Effects]

In the present application example, in the case where the retardation film 10 is used in the display 1, the anchor layer 14 provided between the base 13 and the alignment layer 15 in the retardation film 10 is provided with an antistatic function in addition to the basic function of the layer itself. Further, in the case where the retardation film 20 is used in the display 1, the protective layer 16 provided on the back of the base 13 in the retardation film 20 is provided with an antistatic function in addition to the basic function of the layer itself. This makes it possible to prevent occurrence of a large amount of static electricity on the film during the manufacturing process without providing a special layer for prevention of static charge in the film, or without providing a special equipment for prevention of static charge. As a result, occurrence of alignment disorder is reduced in a simple manner, and therefore, occurrence of streaks and/or unevenness in an image display surface is reduced.

4. Modifications

[First Modification]

Although a case where the retardation layer 12 is in direct contact with the alignment layer 15 has been exemplified in the above-described embodiments, a certain layer may be provided between the retardation layer 12 and the alignment layer 15. For example, a non-alignable thin film (not illustrated) having a shape in accordance with asperities on the alignment layer 15 may be provided between the retardation layer 12 and the alignment layer 15. The non-alignable thin film refers to a thin film in which a large number of molecules located on the surface of the non-alignable thin film are not alignable, namely, are aligned in random directions. The non-alignable thin film moderates the influence, on the retardation layer 12, of molecular alignment on the surface (particularly the surfaces of the fine grooves V1 and V2) of the alignment layer 15 as an underlayer. The non-alignable thin film is formed of, for example, UV-curable resins. Examples of the UV-curable resins include UV-curable acrylic resins. In the case where the non-alignable thin film is formed through curing of a UV-curable acrylic resin, the uncured or not-completely-cured UV-curable acrylic resin as a raw material for the non-alignable thin film preferably has three or more functional groups. The non-alignable thin film is formed by a process causing no alignment of the molecules, such as coating and sputtering. The non-alignable thin film is formed in accordance with the surfaces of the fine grooves V1 and V2, and has substantially uniform thickness. The thickness of the non-alignable thin film is preferably 20 nm or more from the viewpoint of eliminating the influence of molecular alignment of the underlayer. The non-alignable thin film preferably has a upper limit in thickness to the extent that the top of the non-alignable thin film does not become flat.

[Second Modification]

Although the retardation film 10 (or the retardation film 20) is provided on the image display surface side of the display 1 in the application example, the retardation film may be provided in other parts. For example, the retardation film 10 (or the retardation film 20) may be provided between the polarizer 41A and the transparent substrate 42, which is however not illustrated. The display 1 according to the present modification may be manufactured in the following manner. First, a laminate (not illustrated) is prepared that includes the transparent substrate 42, the pixel electrodes 43, the alignment layer 44, the liquid crystal layer 45, the alignment layer 46, the common electrode 47, the color filter 48, and the transparent substrate 49 stacked in this order. Subsequently, the retardation film 10 (or the retardation film 20) is bonded to the back (a surface closer to the transparent substrate 42) of the laminate, and then the polarizer 41A is bonded onto the retardation film 10 (or the retardation film 20). Subsequently, the polarizer 41B is bonded to the front surface (a surface closer to the transparent substrate 49) of the laminate. In this way, the display panel 4 including the retardation film 10 (or the retardation film 20) is completed. Thereafter, the backlight unit 3 is attached onto the back (on the polarizer 41A side) of the display panel 4. In this way, the display 1 according to the present modification is completed.

In the display 1 according to the present modification, when light emitted from the backlight unit 3 enters the polarizer 41A, only a polarization component in the horizontal direction is transmitted, and enters the retardation film 10 (or the retardation film 20). The light passes through the retardation film 10 (or the retardation film 20), and then passes through the above-described laminate and the polarizer 41B in order, and is then emitted as a polarization component in the vertical direction. This results in two-dimensional display. Here, the disposed retardation film 10 (or the retardation film 20) compensates retardation of liquid crystal in viewing from an oblique direction, allowing a reduction in leakage light and/or coloring in an oblique direction during black display. In other words, the retardation film 10 (or the retardation film 20) may be used as a viewing-angle compensation film such as an A plate and a C plate.

[Third Modification]

Although a case where each of the retardation regions 12A and 12B of the retardation film 10 (or the retardation film 20) extends in a horizontal direction has been exemplified in the above-described embodiments, the retardation region may extend in other directions.

[Fourth Modification]

Although a case where each of the retardation regions 12A and 12B of the retardation film 10 (or the retardation film 20) extends in the horizontal direction or in the vertical direction over the retardation film 10 (or the retardation film 20) as a whole has been exemplified in the above-described embodiments and the modifications thereof, the retardation regions may be two-dimensionally arranged in both the horizontal and vertical directions.

[Fifth Modification]

Although a case where the retardation film 10 (or the retardation film 20) is used in the display 1 has been exemplified in the above-described embodiments and the modifications thereof, it goes without saying the retardation film may be used in any other device.

[Sixth Modification]

Although description has been made hereinbefore on a case where the polarizing glasses 2 are of a circular polarization type, and the display 1 is a display for circular polarization glasses, the present invention may be applied to a case where the polarizing glasses 2 are of a linear polarization type, and the display 1 is a display for linear polarization glasses.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An alignment film, comprising
an anchor layer and an alignment layer stacked in this order on a base,
wherein the alignment layer has a plurality of fine grooves of nanometer order scale on a surface thereof, the plurality of fine grooves extending in a particular direction,
wherein the anchor layer is in contact with the base and with the alignment layer, and has a surface resistance of $10^{11}$ ohms per square centimeter or more and $10^{12}$ ohms per square centimeter or less,
wherein the anchor layer includes an anchor material including an acrylate monomer with three or more functional groups,
wherein the anchor material includes 50 parts by weight or more and 90 parts by weight or less of the acrylate monomer, a conductive material, and a solvent into which the conductive material is dispersed, and
wherein the anchor layer has a thickness ranging from 0.5 µm to 3.5 µm.

2. The alignment film according to claim 1,
wherein the base is a thermoplastic norbornene-based resin film.

3. The alignment film according to claim 2, wherein the conductive material is one of a conductive polymer and an ionic liquid.

4. The alignment film according to claim 2, wherein the solvent contains butyl acetate and isopropyl alcohol.

5. The alignment film according to claim 2, wherein the anchor layer is formed by applying a material, as the anchor material, containing the acrylate monomer, an ester-based resin, a urethane-based resin, the conductive material, and the solvent onto the base, and then drying and curing the applied material.

6. An alignment film, comprising
an alignment layer on a main surface of a base, the base including an antistatic layer laminated on a back thereof,
wherein the alignment layer includes a plurality of fine grooves of nanometer order scale on a surface thereof, the plurality of fine grooves extending in a particular direction,
wherein the antistatic layer has a surface resistance of $10^{11}$ ohms per square centimeter or more and $10^{12}$ ohms per square centimeter or less,
wherein the antistatic layer includes an acrylate monomer with three or more functional groups,
wherein the antistatic layer includes 50 parts by weight or more and 90 parts by weight or less of the acrylate monomer, a conductive material, and a solvent into which the conductive material is dispersed, and
wherein the antistatic layer has a thickness ranging from 0.5 µm to 3.5 µm.

7. A retardation film, comprising
an anchor layer, an alignment layer, and a retardation layer stacked in this order on a base,
wherein the alignment layer has a plurality of fine grooves of nanometer order scale on a surface thereof, the plurality of fine grooves extending in a particular direction,
wherein the anchor layer is in contact with the base and with the alignment layer, and has a surface resistance of $10^{11}$ ohms per square centimeter or more and $10^{12}$ ohms per square centimeter or less,
wherein the anchor layer includes an anchor material including an acrylate monomer with three or more functional groups,
wherein the anchor material includes 50 parts by weight or more and 90 parts by weight or less of the acrylate monomer, a conductive material, and a solvent into which the conductive material is dispersed, and
wherein the anchor layer has a thickness ranging from 0.5 µm to 3.5 µm.

8. A retardation film, comprising
an alignment layer and a retardation layer stacked in this order on a main surface of a base, the base including an antistatic layer laminated on a back thereof,
wherein the alignment layer includes a plurality of fine grooves of nanometer order scale on a surface thereof, the plurality of fine grooves extending in a particular direction,
wherein the antistatic layer has a surface resistance of $10^{11}$ ohms per square centimeter or more and $10^{12}$ ohms per square centimeter or less,
wherein the antistatic layer includes an acrylate monomer with three or more functional groups,
wherein the antistatic layer includes 50 parts by weight or more and 90 parts by weight or less of the acrylate monomer, a conductive material, and a solvent into which the conductive material is dispersed, and
wherein the antistatic layer has a thickness ranging from 0.5 µm to 3.5 µm.

9. A display, comprising:
a light source;
a display cell performing display based on light from the light source;
a first polarizer provided on a light source side of the display cell;
a second polarizer provided on a display side of the display cell; and
a retardation film disposed on a light emission side of each of one or both of the first polarizer and the second polarizer, wherein the retardation film includes an alignment layer on a main surface of a base, the base including an antistatic layer laminated on a back thereof, wherein the alignment layer has a plurality of fine grooves of nanometer order scale on a surface thereof, the plurality of fine grooves extending in a particular direction, wherein the antistatic layer has a surface resistance of $10^{11}$ ohms per square centimeter or more and $10^{12}$ ohms per square centimeter or less, wherein the antistatic layer includes an acrylate monomer with three or more functional group, wherein the antistatic layer includes 50 parts by weight or more and 90 parts by weight or less of the acrylate monomer, a conductive material, and a solvent into which the conductive material is dispersed, and wherein the antistatic layer has a thickness ranging from 0.5 μm to 3.5 μm.

10. A display, comprising:

a light source;

a display cell performing display based on light from the light source;

a first polarizer provided on a light source side of the display cell;

a second polarizer provided on a display side of the display cell; and a retardation film disposed on a light emission side of each of one or both of the first polarizer and the second polarizer, wherein the retardation film includes an alignment layer and a retardation layer stacked in this order on a main surface of a base, the base including an antistatic layer laminated on a back thereof, wherein the alignment layer includes a plurality of fine grooves of nanometer order scale on a surface thereof, the plurality of fine grooves extending in a particular direction, wherein the antistatic layer has a surface resistance of $10^{11}$ ohms per square centimeter or more and $10^{12}$ ohms per square centimeter or less, wherein the antistatic layer includes an acrylate monomer with three or more functional groups, wherein the antistatic layer includes 50 parts by weight or more and 90 parts by weight or less of the acrylate monomer, a conductive material, and a solvent into which the conductive material is dispersed, and wherein the antistatic layer has a thickness ranging from 0.5 μm to 3.5 μm.

\* \* \* \* \*